United States Patent
McDonald

(10) Patent No.: US 7,159,216 B2
(45) Date of Patent: Jan. 2, 2007

(54) METHOD AND APPARATUS FOR DISPATCHING TASKS IN A NON-UNIFORM MEMORY ACCESS (NUMA) COMPUTER SYSTEM

(75) Inventor: Jarl Wendell McDonald, Guilford, CT (US)

(73) Assignee: International Business Machines Corporation, Armonk, NY (US)

(*) Notice: Subject to any disclaimer, the term of this patent is extended or adjusted under 35 U.S.C. 154(b) by 707 days.

(21) Appl. No.: 10/013,732

(22) Filed: Nov. 7, 2001

(65) Prior Publication Data

US 2003/0088608 A1 May 8, 2003

(51) Int. Cl.
G06F 9/46 (2006.01)
(52) U.S. Cl. ........................... 718/100; 718/103
(58) Field of Classification Search ........ 711/100–173; 718/100–108
See application file for complete search history.

(56) References Cited

U.S. PATENT DOCUMENTS

| | | | |
|---|---|---|---|
| 5,784,697 A | 7/1998 | Funk et al. ................. 711/170 |
| 6,105,053 A * | 8/2000 | Kimmel et al. ............. 718/105 |
| 6,205,528 B1 | 3/2001 | Kingsbury et al. ......... 711/170 |
| 6,275,536 B1 * | 8/2001 | Chen et al. ............ 375/240.25 |
| 6,336,177 B1 | 1/2002 | Stevens |
| 6,374,367 B1 | 4/2002 | Dean et al. |
| 6,381,682 B1 | 4/2002 | Noel et al. |
| 6,434,591 B1 | 8/2002 | Watakabe et al. |
| 6,477,562 B1 | 11/2002 | Nemirovsky et al. |
| 2002/0016878 A1 | 2/2002 | Flores |
| 2002/0078121 A1 | 6/2002 | Ballantyne |
| 2002/0087736 A1 * | 7/2002 | Martin ....................... 709/312 |
| 2002/0129115 A1 | 9/2002 | Noordergraaf et al. |

FOREIGN PATENT DOCUMENTS

| | | |
|---|---|---|
| JP | 07-302246 A | 11/1995 |
| JP | 11-316747 A | 11/1999 |
| JP | 2000-215071 A | 8/2000 |

OTHER PUBLICATIONS

Russinovich. "Inside the Windows NT Scheduler" (Parts 1 & 2), date of publication unknown (selected pages were printed from Internet Mar. 22, 2001).
Solomon & Russinovich, "Inside Microsoft Windows 2000" (Microsoft Press), pp. 368-373.
Compaq Computer Corp, "Tru64 UNIX NUMA Overview" (Jan. 2001).
IBM/Sequent "DYNIX/ptx NUMA APIs" date of publication unknown (selected pages were printed from Internet Oct. 2, 2001).

* cited by examiner

Primary Examiner—Lewis A. Bullock, Jr.
Assistant Examiner—Kenneth Tang
(74) Attorney, Agent, or Firm—Roy W. Truelson; Joscelyn G. Cockburn

(57) ABSTRACT

A dispatcher for a non-uniform memory access computer system dispatches threads from a common ready queue not associated with any CPU, but favors the dispatching of a thread to a CPU having a shorter memory access time. Preferably, the system comprises multiple discrete nodes, each having a local memory and one or more CPUs. System main memory is a distributed memory comprising the union of the local memories. A respective preferred CPU and preferred node may be associated with each thread. When a CPU becomes available, the dispatcher gives at least some relative priority to a thread having a preferred CPU in the same node as the available CPU over a thread having a preferred CPU in a different node. This preference is relative, and does not prevent the dispatch from overriding the preference to avoid starvation or other problems.

11 Claims, 9 Drawing Sheets

METHOD AND APPARATUS FOR DISPATCHING TASKS IN A NON-UNIFORM MEMORY ACCESS (NUMA) COMPUTER SYSTEM

BACKGROUND OF THE INVENTION

1. Technical Field

This invention relates to multi-tasking computer systems, and in particular, to task or thread dispatching in systems having multiple central processing units and non-uniform memory access.

2. Description of the Prior Art

A modern computer system typically comprises a central processing unit (CPU) and supporting hardware necessary to store, retrieve and transfer information, such as communications buses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed of a computer system (also called the throughput) may be crudely measured as the number of operations performed per unit of time. Conceptually, the simplest of all possible improvements to system speed is to increase the clock speeds of the various components, and particularly the clock speed of the processor(s). E.g., if everything runs twice as fast but otherwise works in exactly the same manner, the system will perform a given task in half the time. Early computer processors, which were constructed from many discrete components, were susceptible to significant speed improvements by shrinking component size, reducing component number, and eventually, packaging the entire processor as an integrated circuit on a single chip. The reduced size made it possible to increase clock speed of the processor, and accordingly increase system speed.

Despite the enormous improvement in speed obtained from integrated circuitry, the demand for ever faster computer systems has continued. Hardware designers have been able to obtain still further improvements in speed by greater integration (i.e., increasing the number of circuits packed onto a single chip), by further reducing the size of circuits, and by various other techniques. However, designers can see that physical size reductions can not continue indefinitely, and there are limits to their ability to continue to increase clock speeds of processors. Attention has therefore been directed to other approaches for further improvements in throughput of the computer system.

Without changing the clock speed, it is possible to improve system throughput by using multiple processors. The modest cost of individual processors packaged on integrated circuit chips has made this approach practical. However, one does not simply double a system's throughput by going from one processor to two. The introduction of multiple processors to a system creates numerous architectural problems. For example, the multiple processors will typically share the same main memory (although each processor may have its own cache). It is therefore necessary to devise mechanisms that avoid memory access conflicts, and assure that extra copies of data in caches are tracked in a coherent fashion. Furthermore, each processor puts additional demands on the other components of the system such as storage, I/O, memory, and particularly, the communications buses that connect various components. As more processors are introduced, these architectural issues become increasingly complex, scalability becomes more difficult, and there is greater likelihood that processors will spend significant time waiting for some resource being used by another processor.

All of these issues and more are known by system designers, and have been addressed in one form or another. While perfect solutions are not available, improvements in this field continue to be made.

One architectural approach that has gained some favor in recent years is the design of computer systems having discrete nodes of processors and associated memory, also known as distributed shared memory computer systems or non-uniform memory access (NUMA) computer systems. In a conventional symmetrical multi-processor system, main memory is designed as a single large data storage entity, which is equally accessible to all CPUs in the system. As the number of CPUs increases, there are greater bottlenecks in the buses and accessing mechanisms to such main memory. A NUMA system addresses this problem by dividing main memory into discrete subsets, each of which is physically associated with a respective CPU, or more typically, a respective group of CPUs. A subset of memory and associated CPUs and other hardware is sometimes called a "node". A node typically has an internal memory bus providing direct access from a CPU to a local memory within the node. Indirect mechanisms, which are slower, exist to access memory across node boundaries. Thus, while any CPU can still access any arbitrary memory location, a CPU can access addresses in its own node faster than it can access addresses outside its node (hence, the term "non-uniform memory access"). By limiting the number of devices on the internal memory bus of a node, bus arbitration mechanisms and bus traffic can be held to manageable levels even in a system having a large number of CPUs, since most of these CPUs will be in different nodes. From a hardware standpoint, this means that a NUMA system architecture has the potential advantage of increased scalability.

A NUMA system provides inter-node access so that it has a single logical main memory, each location having a unique address. But inter-node access is relatively slow and burdensome of certain system resources. In order for a NUMA system to work efficiently, the data required by a CPU should generally be stored in the real memory of the same node. It is impractical to guarantee that this will always be the case without enforcing unduly rigid constraints. Memory allocation mechanisms which reduce the need for inter-node memory access are desirable.

In a multi-tasking system computer system, an operating system typically manages the allocation of certain system resources, and in particular, the dispatching of tasks (or threads) to a CPU and the allocation of memory. In such a system, multiple threads are concurrently active. Usually, the number of active threads exceeds the number of CPUs in the system. A given thread typically executes in a CPU for some number of cycles, and then, although not finished, is temporarily halted and placed in a queue, to continue execution later. A thread may be halted because it has reached a time limit, because it is preempted by a higher priority thread, because it must wait for some latency event, such as a storage access or a lock release, or for some other reason. By allowing another thread to execute while the first thread is waiting, the CPU resources are more fully utilized. When a CPU becomes available to execute a thread for these or any other reasons, a dispatcher within the operating system typically determines which of multiple waiting threads will be dispatched to the available CPU for execution.

Conventional dispatchers are usually designed for symmetric multiprocessor computer systems in which memory is equally accessible to all CPUs, but fail to optimally consider the effect of non-uniform memory access on task dispatching. For example, in a dispatcher used by the Microsoft Windows 2000™ operating system, threads are selected for dispatch according to various considerations, including a pre-assigned priority, the length of time in the queue, whether the thread last executed on the same CPU, whether the CPU is designated the preferred processor for the thread, and other factors. These factors are intended to optimize the CPU utilization, which is, of course, normally desirable. However, the nodal locations of CPUs are not considered by the dispatcher, and although CPUs may be utilized to a high degree, the system throughput can suffer as a result of an unnecessarily large number of inter-nodal memory accesses.

Some dispatchers are capable of enforcing rigid constraints on the allocation of threads or tasks to CPUs, so that a particular thread always executes on the same CPU, or in the same node. Logical partitioning of a computer system, in which system resources are divided into discrete subsets, and processes are assigned to respective subsets, can achieve similar effects. In some cases, these effects are deliberate (e.g., one group of processes is guaranteed a certain amount of resource, without interference from other processes). However, this can result in underutilization of some of the CPUs and/or bottlenecks in over-utilized CPUs.

One known operating system designed for a NUMA platform is the PTX operating system by Sequent Computers (now a division of IBM Corporation). PTX provides multiple run queues, one for each CPU, and offers the user the capability to define additional run queues for arbitrary groups of CPUs. When a process is initiated, it is assigned to one of the run queues, and all threads spawned by the process are placed on that run queue when awaiting execution. The operating system thereafter preferentially dispatches threads of the process to the CPU or CPUs of its assigned run queue, and at a somewhat lower preference level, to CPUs within the same system node as the CPU (or CPUs) of the assigned run queue. The operating system further includes the capability to monitor CPU utilization for each CPU and memory utilization for each node on an on-going basis. If CPU utilization and/or memory utilization in a particular node are sufficiently high, the operating system may dispatch a thread to a node other than the node containing the preferred CPU or CPUs. In this manner, PTX takes advantage of the NUMA architecture, yet avoids rigid constraints on thread dispatching which could cause large disparities in resource utilization.

Although not necessarily recognized, a need exists for an improved dispatcher for NUMA systems, which has the significant advantages of PTX to take into account the nodal locations of the various CPU's when dispatching threads, and thus reduce the frequency of inter-nodal memory accesses, but which can be adapted to simpler operating systems, and in particular, to operating systems which do not support multiple run queues and CPU/memory utilization monitoring.

SUMMARY OF THE INVENTION

In accordance with the present invention, a dispatcher for a non-uniform memory access computer system dispatches all threads from a single, common ready queue (also known as a run queue), which is not preferentially associated with any CPU or group of CPUs. The dispatcher considers the physical placements of CPUs when dispatching threads, and specifically, preferentially favors the dispatching of a thread to a CPU having a shorter memory access time for accessing a memory subset likely to contain a relatively larger share of thread required data.

In the preferred embodiment, the NUMA system is designed as a system of multiple discrete nodes, each having a local memory, one or more CPUs, an internal node bus, and an interface for communicating with other nodes. System main memory is a distributed memory comprising the union of local memories in each node. Memory access to a location within the node of the processor is faster than memory access across a node boundary.

In the preferred embodiment, a respective preferred CPU may be associated with each thread. When a CPU becomes available, the dispatcher gives at least some relative priority to a thread having a preferred CPU in the same node as the available CPU over a thread having a preferred CPU in a different node. This is a relative priority, and not an absolute constraint. It is still possible to select a thread for dispatch to a CPU which is not in the same node as the thread's preferred CPU, and thus avoid starvation or other problems which may arise from too rigidly constraining the thread dispatching choice.

In the preferred embodiment, a preferred node, called an "ideal node", is generally assigned to user processes. When a process spawns a thread, the thread inherits the ideal node of the process. Additionally, a CPU in the ideal node is selected as the "ideal processor" for the thread. The selection of ideal processors for threads spawned by a single process is generally rotated on a round-robin basis. Other selection criteria being equal, threads are preferentially dispatched to ideal processors first, and to ideal nodes second. In some circumstances, the dispatcher may choose to idle a processor rather than dispatch to it a thread having a different ideal node, but it may dispatch such a thread in other circumstances.

Various alternative dispatching techniques which account for non-uniform memory access are possible. In one alternative, when a CPU becomes available, the dispatcher gives at least some relative priority to a thread which last executed on a CPU in the same node as the available CPU over a thread which last executed in a different node.

The use of a single, common ready queue for all threads, which is not associated with any particular CPU or group of CPUs, is consistent with various non-NUMA operating systems. By observing a loose, relative preference for dispatching threads to the same node in accordance with the embodiments of the present invention herein described, threads tend to execute in the same node, and the node's real memory tends to accumulate a proportionately larger share of the data needed by the thread. As a result, the frequency of inter-nodal memory accesses is reduced over that of a system which does not take nodal placement into account in dispatching threads. At the same time, rigid node constraints are avoided, enabling utilization of the entire system and avoiding starvation and other issues.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

As described herein, a dispatcher for a multiprocessor, non-uniform memory access (NUMA) computer system dispatches threads for a single, global ready queue, takes a nodal affinity into account in selecting threads or tasks for dispatching to the various processors, so that each thread tends to execute in a consistent node, and memory pages needed by the thread tend to accumulate in the local real memory of that node. For consistency, the term "thread" is used herein to describe an instance of a sequence of computer executable instructions having its own state, which is the entity dispatched by a dispatcher. In some environments, these are referred to as "tasks", and no distinction is made herein between "threads" and "tasks". The term "thread" is used by some to imply that a process spawns multiple concurrently executable threads from a single program; however, as used herein, no such limitation should be implied, and a process may generate only a single thread of execution, or may generate multiple threads.

NUMA System Hardware

Figure 1:
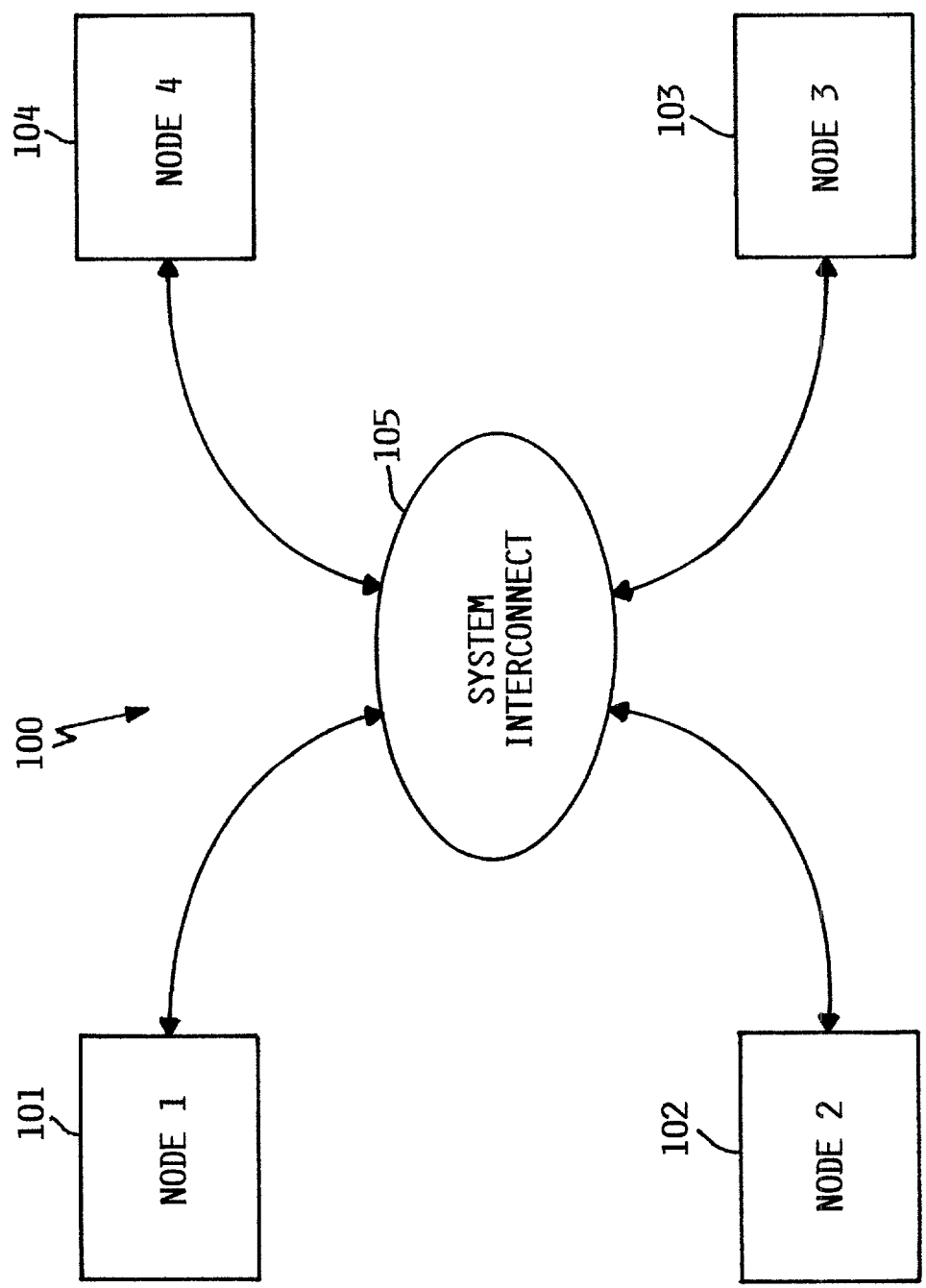
FIG. 1 is a high-level block diagram of the major components of a multi-node, multiprocessor computer system, in accordance with the preferred embodiment of the present invention.

FIG. 1 is a high-level block diagram of the major hardware components of a multi-node, multiprocessor computer system 100 in accordance with the preferred embodiment of the present invention. Computer system 100 uses a computer architecture based on Distributed Shared Memory (DSM), and is a NUMA system. Computer system 100 comprises multiple nodes 101–104, of which four are shown in the exemplary system of FIG. 1, it being understood that the number of nodes may vary. The nodes are connected by an inter-node communications network 105 that permits any node to communicate with any other node. The purpose of inter-node communications network is to allow devices to communicate across node boundaries, and in particular, to allow a processor in any node to access the memory resident in any other node. In the preferred embodiment, inter-node network 105 is a switch-based network that uses the Scalable Coherent Interface (SCI) interconnection mechanism conforming to the IEEE 1596-1992 standard. SCI is a high-bandwidth interconnection network implemented by a pumped bus that sends packets on each individual point-to-point interconnect, and that provides for cache coherence throughout the system. Further information concerning SCI may be found in IEEE Std 1596-1992 (Aug. 3, 1993), herein incorporated by reference.

While inter-node network 105 it preferably a SCI compliant communications medium, any of various alternatives, now existing or hereafter developed, could be used. The inter-node communications medium should preferably provide high bandwidth and low latency, and be scalable to allow for the addition of more nodes. Suitable such media include point-to-point interconnection links with a high data throughput (e.g., 1 gigabyte/second or greater). The links can be configured in any number of suitable ways, such as in a ring topology, in arbitrary topologies through switches, or in a combination of both. The links can be wired or wireless (optical, RF, etc.) depending upon system performance needs. Examples of additional topologies are described in "Interconnect Topologies with Point-To-Point Rings," Ross E. Johnson and James E. Goodman, December 1991, *Computer Sciences Technical Report* #1058, University of Wisconsin—Madison, which is hereby incorporated by reference, it being understood that the examples described therein are not necessarily exhaustive of all types of suitable networks.

Figure 2:
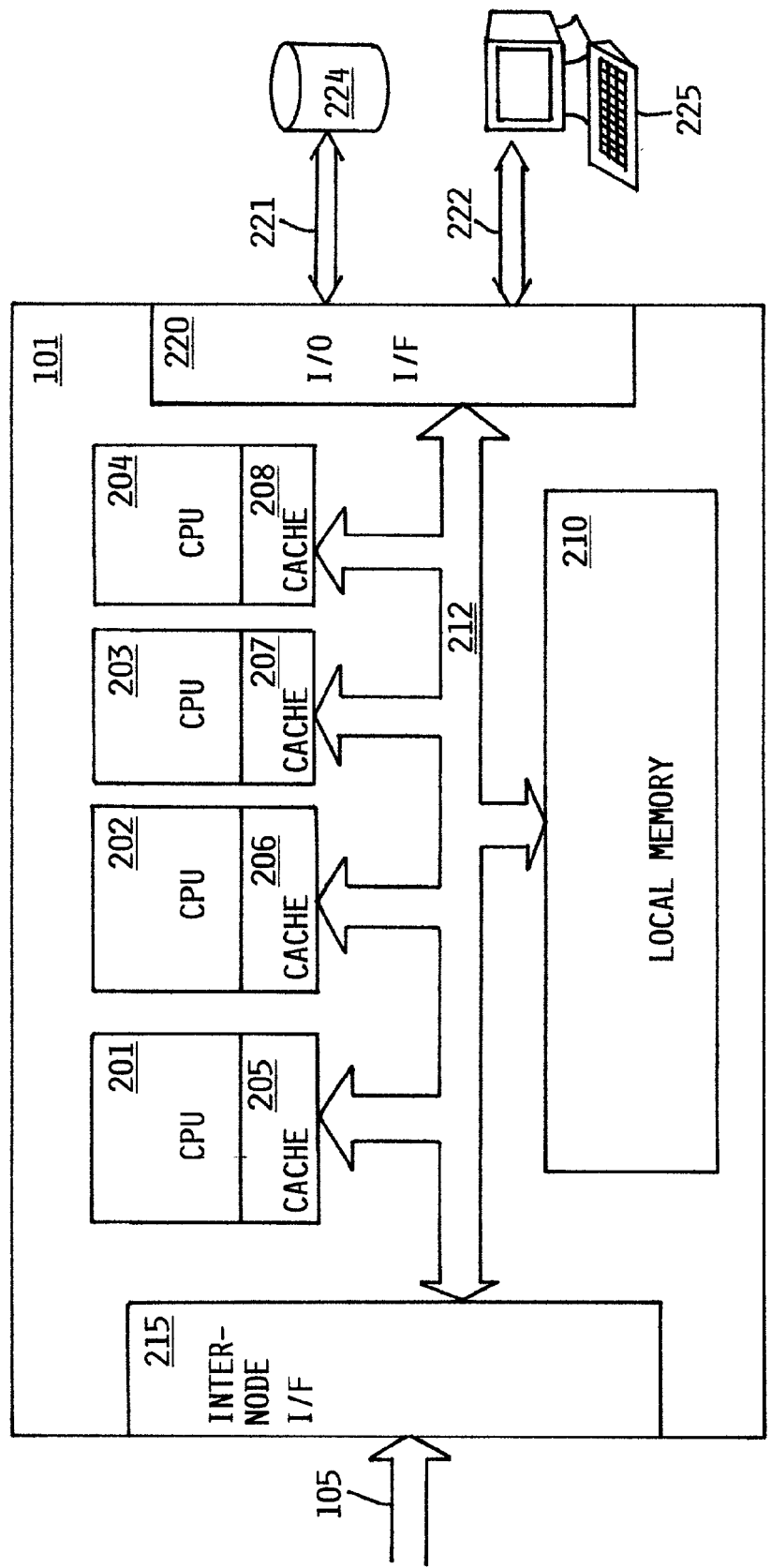
FIG. 2 is a block diagram of the major hardware components of a typical node of a multi-node computer system, according to the preferred embodiment.

FIG. 2 is a block diagram of the major hardware components of a typical node 101 of computer system 100 in accordance with the preferred embodiment. For consistency in the description contained herein, a node is designated generically as reference numeral 101, it being understood that this could be any of nodes 101–104. Node 101 includes multiple central processing units (CPUs) 201–204 which perform basic machine processing functions on instructions and other data from a distributed main memory. Each CPU 201–204 contains or controls a respective cache 205–208 for temporary storage of data and instructions. For a large, multiprocessor computer system, a cache typically exists at multiple levels and as multiple structures. For example, a CPU may include a level 1 cache dedicated solely to the storage of instructions which execute on the CPU (L1 instruction cache), a physically separate level 1 cache dedicated solely to the storage of data other than instructions which is manipulated by the CPU (L1 data cache), and a level 2 cache (L2 cache) which stores both instructions and other data, and which is used to feed the L1 instruction cache and L1 data cache. The cache structure or structures are represented in simplified form in FIG. 2 as a single block 205–208 for each respective processor. For purposes of the present invention, the precise implementation details of caching in each processor are not significant. Many other variations are possible, and the present invention is not limited to any particular cache design, nor does it necessarily require the use of caches at all.

Computer system 100 utilizes a distributed main memory, comprising a separate local memory 210 in each respective node 101. The total addressable main memory within system 100 is the sum of the addressable local memory 210 in each respective node. All CPUs throughout the system share the same addressable distributed main memory. Thus, the real address space of main memory is constant across the entire system, and any memory location in a local memory 210 has a unique real address which is the same for all processors and all nodes.

Inter-node interface unit 215 connects node 101 to inter-node network 105, thereby allowing node 101 to communicate with other nodes in system 100. Interface unit 215 typically includes a cache or buffer for temporary storage of data passing between nodes.

I/O bus interface unit 220 provides communication to one or more I/O devices through one or more I/O buses 221–222. I/O buses 221–222 may be of any suitable type for communication with conventional I/O devices, such as direct access storage devices (DASD) 224, tape drives, workstations 225, printers, and remote communications adapters for communications with remote devices or with other computer systems through dedicated communications lines or networks. For example, I/O bus 221 may be an industry standard PCI bus. Although two I/O buses and two I/O devices are shown in FIG. 2, it should be understood that the number of such buses and devices may vary, and further that it is not necessary that all nodes 101 contain I/O interface units 220 or attached I/O devices.

Internal node bus 212 provides communication among the various components of node 101. In particular, bus 212 transfers data between local memory 210 and caches 205–208 of respective CPUs 201–204 responsive to memory accesses issued by the CPUs. Monitoring logic in the local memory 210, inter-node interface 215, and/or bus 212 itself determines whether a particular real address requested in a memory access is contained in the local memory 210 of node 101, or in a local memory of a different (remote) node, and directs the memory access to local memory 210 or to inter-node interface 215 for communication with the remote node, as the case may be. It will be observed that a memory access to a real address within local memory 210 will cross bus 212 and return in a relatively short number of machine cycles, while a memory access to a real address within the local memory of a remote node will, in at least some cases, cross node bus 212 of the requesting node, inter-node interface 215 of the requesting node, inter-node network 215, a corresponding inter-node interface of the responding node, and a corresponding node bus of the responding node, to reach the local memory of the responding node in which the data resides. (This operation may in some cases be shortened if the requested data is in one of the interface caches). As a result, a memory access to a remote node generally requires a relatively greater number of cycles.

While a system having four nodes is shown in FIG. 1, and a typical node having four CPUs and various other devices is shown in FIG. 2, it should be understood that FIGS. 1 and 2 are intended only as a simplified example of one possible configuration of a NUMA system for illustrative purposes, that the number and types of possible devices in such a configuration may vary, and that the system often includes additional devices not shown. It should further be understood that it is not required that all nodes be identical, or that all nodes have the same number of CPUs or the same amount of addressable local memory.

Operating System Overview

Figure 3:
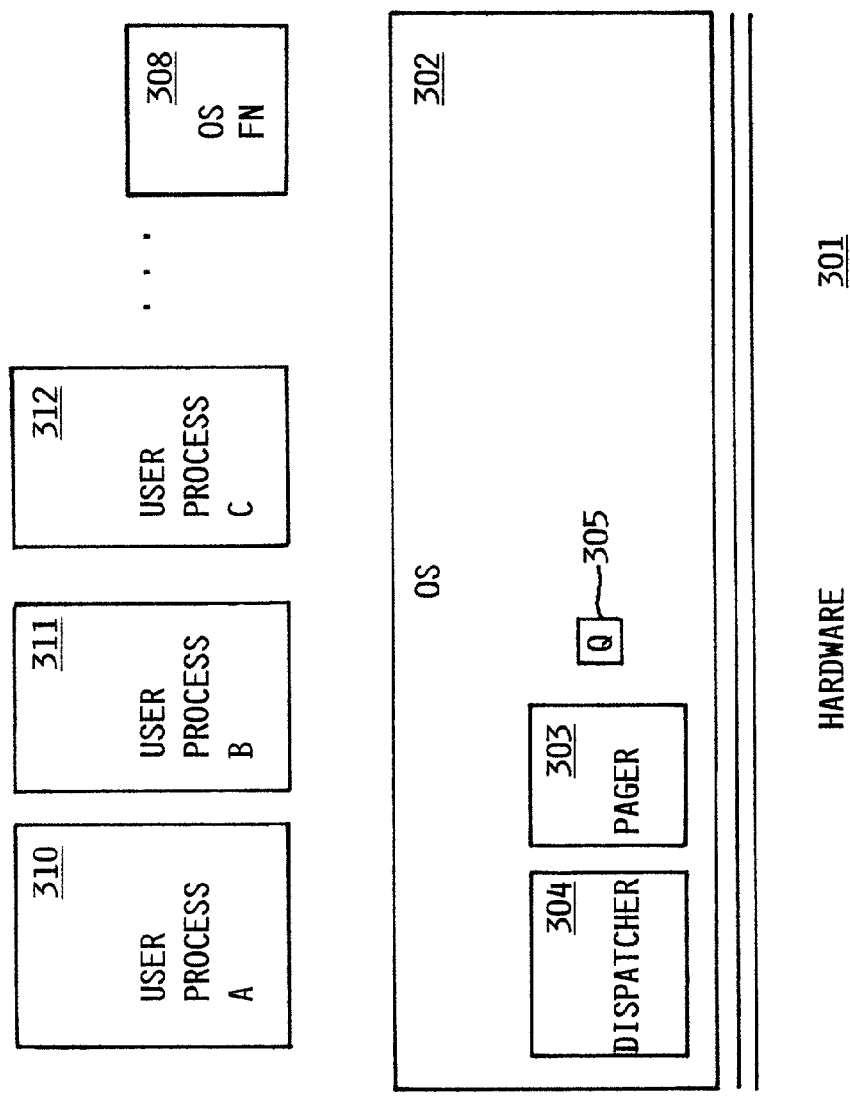
FIG. 3 is a conceptual illustration showing the division of hardware and software function at different levels of abstraction in a multi-node computer system, according to the preferred embodiment 100.

FIG. 3 is a conceptual illustration showing the division of hardware and software function at different levels of abstraction in computer system 100. As is well known, a computer system is a sequential state machine which performs processes. These processes can be represented at varying levels of abstraction. At a high level of abstraction, a user specifies a process and input, and receives an output. As one progresses to lower levels, one finds that these processes are sequences of instructions in some programming language, which continuing lower are translated into lower level instruction sequences, and pass through operating system code and ultimately to data bits which get put in machine registers to force certain actions. At a very low level, changing electrical potentials cause various transistors to turn on and off. In FIG. 3, the "higher" levels of abstraction are represented toward the top of the figure, while lower levels are represented toward the bottom.

Hardware level 301 shown in FIG. 3 represents the physical processors, memory, buses, and other components which cause instructions to be executed. As used herein, hardware level 301 represents the collection of physical devices (as opposed to data stored in devices) shown in FIGS. 1 and 2, including other hardware not shown in FIGS. 1 and 2.

Immediately above hardware is low-level operating system level 302, which in some operating systems is called a "kernel". In a physical sense, the operating system is code, i.e., it is data in the form of instructions which is stored in various memory locations and executed on one or more processors to perform the required function. The low-level operating system provides certain base operating system function needed to share system resources, allocate memory, enforce security, and so forth. Among the functions provided by low-level operating system 302 are paging function 303 and dispatching function 304. Pager 303 is called when an executing thread attempts to access data which is not currently in the system's distributed main memory, i.e., the data is not in any of the local memories 210 in the various nodes. In this case, pager 303 causes the required data to be fetched from storage (such as a rotating magnetic disk drive storage device), and placed in one of the local memories 210. Dispatcher 304 dispatches threads waiting to be executed to processors for execution, as explained in greater detail herein. Dispatch ready queue structure 305 contains threads waiting for dispatch by dispatcher 304.

Above the level of low-level operating system 302 are various user processes 310–312 (i.e., user application code and data), as well as additional higher-level operating system functions 308. In general, higher-level operating system functions 308 provide additional capabilities and functions to users who wish to access them, but a user process may directly access the low-level operating system 302 for execution.

In the preferred embodiment, the operating system is a Microsoft Windows 2000™ operating system, in which the task dispatcher and pager have been modified as described herein to account for nodal placements of the CPUs and memory. However, virtually any multi-tasking operating system having a single, common ready queue from which tasks are dispatched could be adapted to the functions described herein, such as any of various UNIX™-based operating systems, the IBM AS/400™ operating system, etc., including operating systems hereafter developed.

In a typical computer system design, it is desirable to shield entities at a higher level from knowing implementation details of lower level entities. In the case of the design of the hardware of a NUMA system, this means that the operating system and higher level software are preferably not required to have knowledge of the NUMA characteristics. Typically, therefore, a NUMA system is designed so that the operating system may regard its distributed main memory as just a single monolithic entity which responds to data requests by returning the requested data if it exists, and generating a page fault if it does not. Similarly, the operating system may regard the collection of nodes and processors as simply one large pool of processors, all of which are available to execute any process. This does not mean that all processors will perform a given task in the same time, or that all memory accesses will complete in the same time; for reasons stated earlier, they will not. But it does mean that a memory access will complete without error, regardless of whether the requested memory is in the same node or not. Therefore, an operating system can dispatch threads without regard to the nodes in which the processors are located.

Although the NUMA system hardware is designed to function with standard low-level operating system functions, the computer system will operate more efficiently if the low-level operating system is more conscious of the hardware design, and in particular, if node locations of processors are taken into account in dispatching threads.

Dispatching and Paging Functions

The thread dispatcher described herein operates on the principle that, if threads execute in consistent nodes, data needed by a thread will tend to accumulate in the node of usual execution, and the frequency of inter-node memory accesses will accordingly be reduced. This can only be true if the memory paging mechanism itself exhibits some locality of placement, i.e., if pager 303 is more than randomly likely to place a requested page in some particular local node.

A simple and direct method of implementing a pager that exhibits locality of placement is to restrict page placement to the node of the requesting processor, and this is the method used in the preferred embodiment. I.e., in the event of a page fault, pager 303 always places the new page in the local memory of the node containing the processor which issued the memory access request causing the page fault. Pager 303 selects the best candidate to be paged out from the available pages of the local memory of the node. An alternative method of implementing a pager is to restrict page placement to the ideal node of the requesting process. I.e., an ideal node is associated with each process (as explained more fully herein), and a page is always placed in the local memory of the ideal node associated with the process which caused the page fault, even if this is not the same node as the processor which issued the memory access. The reason behind this alternative method is that pages are placed in a consistent local node, even if threads spawned by a process sometimes execute in different nodes. However, it will be understood that these two alternatives are not the only possible techniques which may be employed by a pager, and that various alternative criteria or combinations of criteria could be used to achieve some degree of locality of page placement.

Thread dispatching depends on the state and priority of the threads. At any instant in time, a thread is in one of several states. For example, a thread may be in an executing state, in which it is executing on a processor, an event wait state, in which it can not execute until the occurrence of some external event and is therefore waiting for the event to occur, or a ready state, in which the thread is ready to execute and is waiting only for an available processor. Depending on the operating system, additional states or refinements of the above states may be defined. Additionally, a priority of execution is associated with each thread. Any of various priority assignment schemes known in the art or hereafter developed may be used. The priority is typically assigned by the user, system administrator, or operating system itself. E.g., the priority of a user application process is often a default priority for user processes specified by the operating system, subject to override by the user. The priority may be fixed for the duration of the thread's existence, or may be adjustable depending on various factors, such as the length of time the thread has been waiting in the ready queue. By convention herein, a higher number indicates a greater priority, although priority could alternatively be in reverse numerical order.

Figure 4:
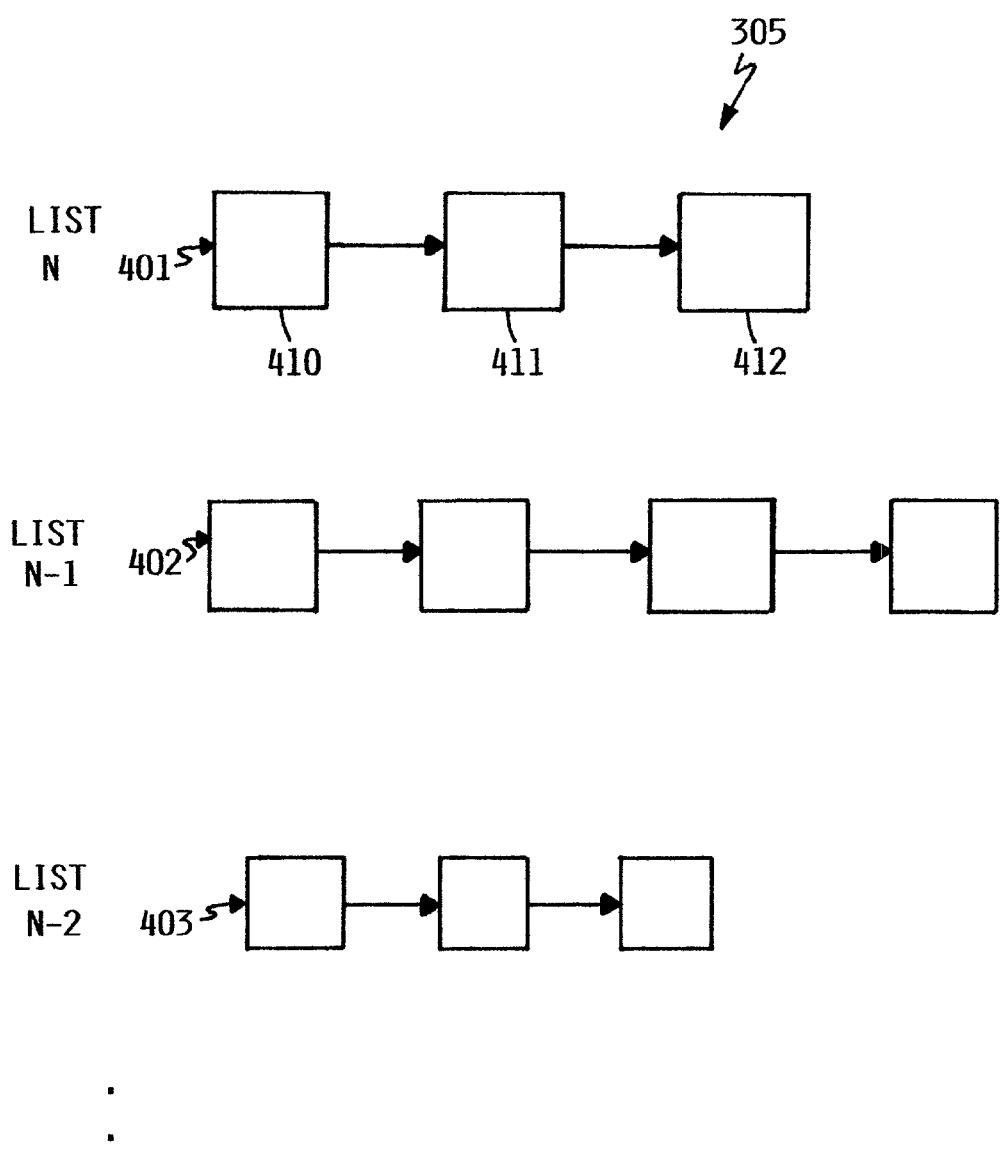
FIG. 4 depicts a ready queue structure of threads waiting for an available processor which is used by the dispatcher, according to the preferred embodiment.

Dispatcher 304 selects a thread for dispatching from thread ready queue structure 305. Ready queue structure 305 is illustrated in greater detail in FIG. 4. As shown in FIG. 4, ready queue structure comprises multiple lists 401–403 of control blocks 410–412, of which three lists are shown for illustrative purposes in FIG. 4, it being understood that the actual number may vary. Each control block list 401–403 is arranged in a FIFO order. Control blocks 410–412 of a given list represent threads associated with a designated priority, which are ready and waiting to execute. I.e., control block lists 401–403 contain threads in the ready state, i.e. those that are ready to execute, and are waiting only for an available processor. When a thread enters the ready state, its control block is placed at the end of the list having the priority associated with the thread. The control block is normally removed from the list when dispatcher 304 dispatches it to a CPU for execution.

In the preferred embodiment, there exists only one ready queue structure 305 for system 100, and all threads which are ready to execute are placed in a list 401–403 in the ready queue structure 305 corresponding to the thread priority. The ready queue is not associated with any CPU or group of CPUs (such as a node), which, as used herein, means that no CPU or group of CPUs receives preferential dispatching of tasks from the ready queue. The ready queue being a memory structure, it will typically be stored in one of the nodes, and the dispatcher will typically execute on a CPU in that node, but this is not what is meant herein by "associated with a CPU or group of CPUs".

Figure 5:
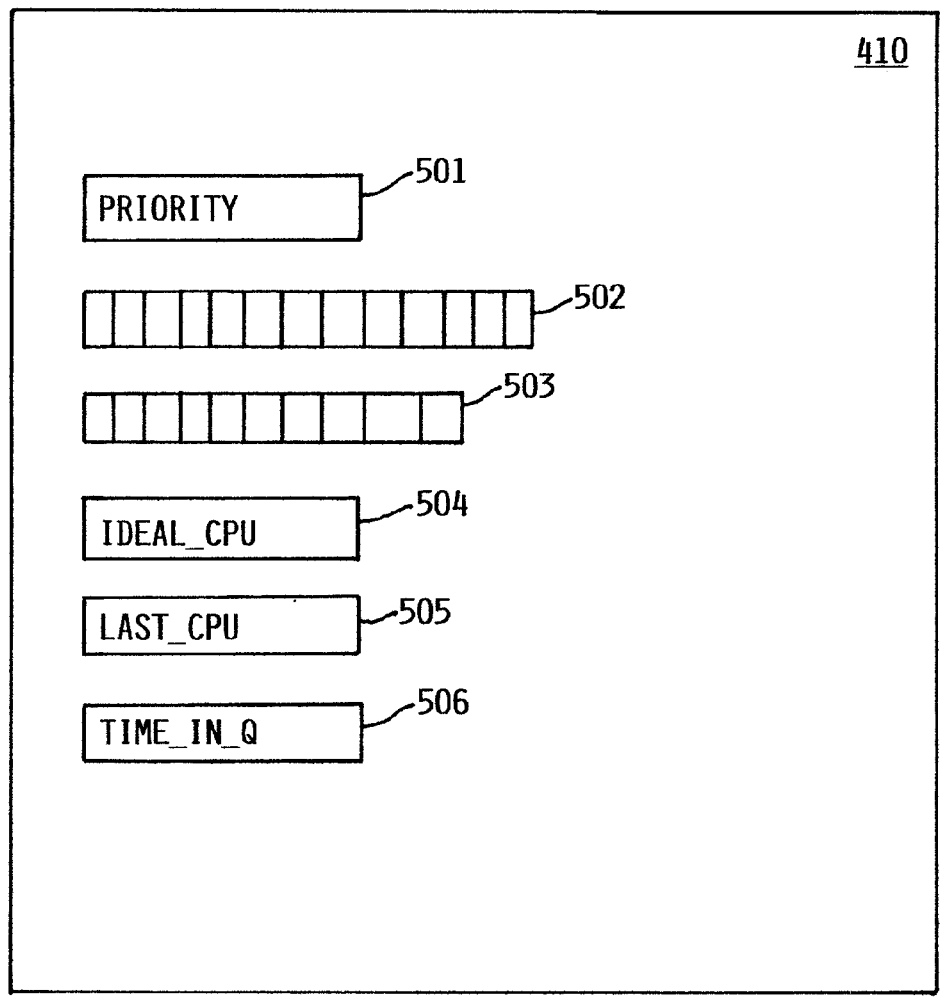
FIG. 5 illustrates certain thread-specific information from the ready queue used by the dispatcher, according to the preferred embodiment.

Each control block 410–412 contains certain state information with respect to an active thread, some of which is used by dispatcher 304 to select a thread for dispatch. FIG. 5 illustrates certain thread-specific information from a typical control block 410 which is used by the dispatcher. As shown in FIG. 5, the control block includes priority 501, affinity mask 502, ideal node mask 503, ideal processor 504, last executed processor 505, and queue time 506. Priority field 501 contains the designated numerical priority of the thread. Affinity mask 502 is a series of mask bits corresponding to respective CPUs, by which a user or system administrator may require that a process may execute only on a subset of the CPUs available on the system, the subset being specified by the affinity mask; in most cases, the user does not restrict execution, and the affinity mask is set so that all CPUs are enabled. Ideal node mask 503 is a set of mask bits corresponding to respective nodes, by which one or more preferred nodes for execution may be designated as described herein. Ideal processor field 504 is a numerical designation of a single preferred CPU for execution of the thread. Last executed processor field 505 is a numerical designation of the CPU on which the thread most recently executed. Queue time field 506 contains a value indicating the length of time the thread has been in the ready queue. E.g., this value may be a timestamp recording when the thread entered the queue, although it could also be a counter which is incremented on the occurrence of certain events or some other value.

FIGS. 4 and 5 show a ready queue and control blocks in simplified form for purposes of illustration, and are not intended to provide an exact blueprint of the format of data structures used by the dispatcher. The ready queue is shown containing multiple control blocks 410–412 in a linked list arrangement, each block 410–412 corresponding to a single respective thread and containing all necessary state information. However, the exact structural details of the queue data structure may vary, and it could be implemented as an array or some other form of data structure. Furthermore, while control blocks 410–412 are shown containing complete state information for each respective thread, a record in the queue may contain only partial information needed by the dispatcher, or may simply contain one or more pointers or other indexes to locations where the necessary data can be found. A control block may contain other and additional state information used by the dispatcher or other functions.

Figure 6:
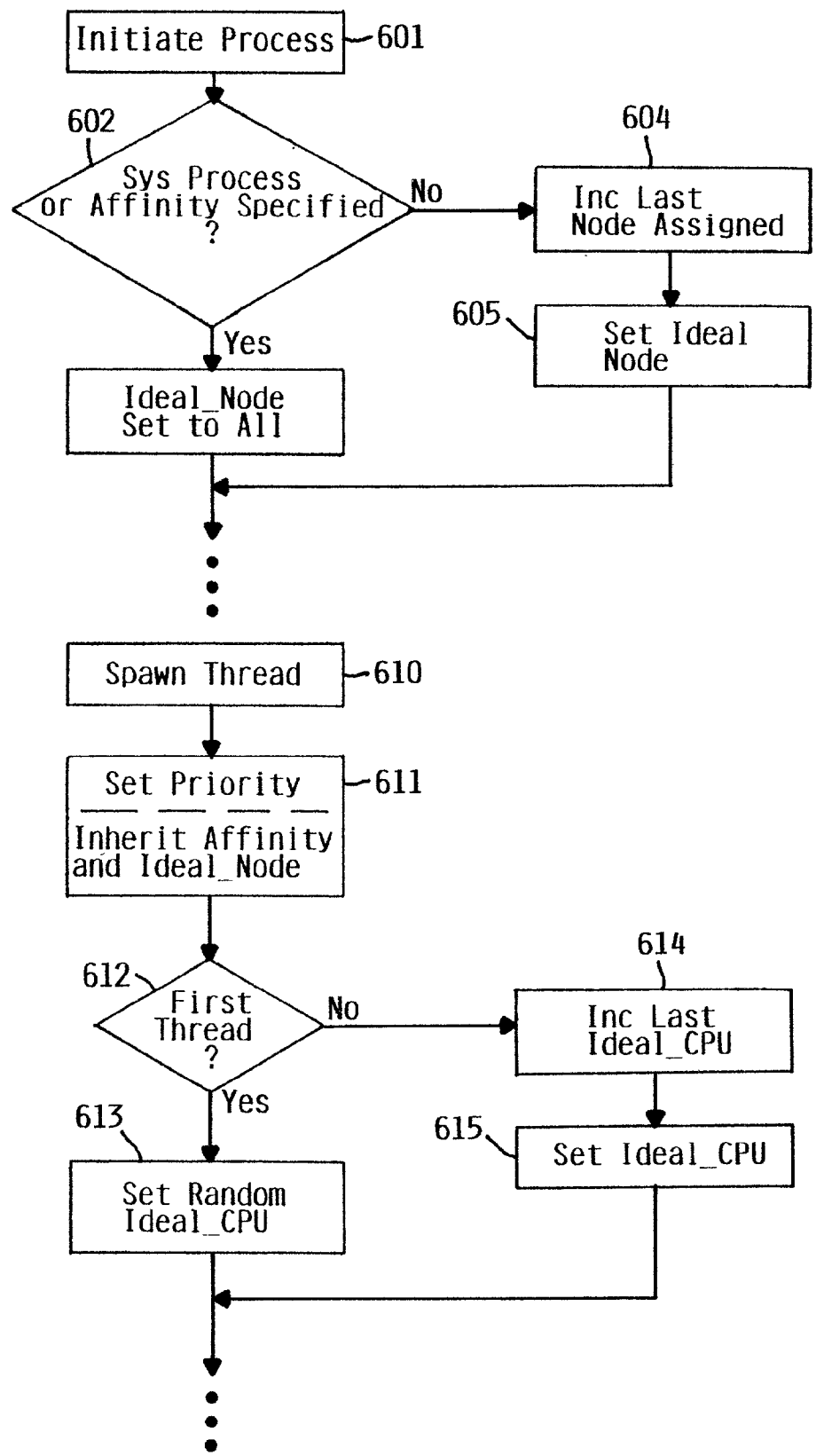
FIG. 6 is a high-level flow diagram showing the initialization of certain thread control values, according to the preferred embodiment.

Certain values in the control block which control the dispatching selection are initialized when a process spawns a thread, and may be inherited from values generated at process initiation. FIG. 6 is a flow diagram showing at a high level certain steps taken by the operating system to initialize thread control values. As shown in FIG. 6, a process is initiated in any conventional manner, causing certain data structures to be generated and initialized, and in particular, causing control blocks or similar structures holding the values depicted in FIG. 5 to be created. Additionally, a priority and a processor affinity are assigned to the process. These steps are represented collectively at a high level as step 601.

An ideal node is associated with the process as follows. If the process is a system process or has a specific processor affinity assigned to it, then the "Y" branch is taken from step 602, and the ideal node is set to all (step 603), i.e., an ideal node mask associated with the process is set with all nodes "on", effectively meaning that there is no ideal node selection. A system process is any of various designated operating system processes which are intended to run in all nodes. A processor affinity is designated by a user or system administrator, and restricts the process to execute in a particular subset of available CPUs. Although a processor affinity is infrequently designated, it is assumed that when such an affinity is designated, it should override a system assigned "ideal node", and therefore the ideal node assignment is not used in this case.

If the process is neither a system process nor has a specific processor affinity (i.e., may run on any processor), then the "N" branch is taken from step 602. In this case, the operating system assigns an ideal node using a round-robin algorithm. I.e., the number of the node most recently assigned to a process is incremented (step 604), and this node is assigned as the ideal node of the process (step 605). The assignment operation is performed by setting a bit in the ideal node mask corresponding to the ideal node selected.

For greatest flexibility, a node mask is used, so that a single node may be designated the ideal node, all of the nodes may be designated, or any arbitrary subset of the nodes may be designated. By default, the operating system selects a single node for most user processes as described above. However, it would be possible for a user to override this selection via a special function call. It is expected that this capability will rarely be used, because it tends to interfere with the balancing of resources performed by the operating system, but there may be special situations which justify it.

A simple round-robin algorithm is used as a default to distribute processes among the available nodes on an equal basis, and thus balance resource utilization. However, any number of alternative methods for assigning a preferred node could be used by the operating system. For example, if the number of processors in each node is not identical, it may be desirable to weight the assignments accordingly. Alternatively, statistics concerning recent CPU utilization could be maintained, and the process assigned to the node having the lowest recent CPU utilization.

At some point, the process will spawn a thread, represented as step 610. The process may spawn a single thread, or may spawn multiple threads, but only one is shown for purposes of illustration in FIG. 6. Among other things, spawning a thread means that a state record or records (e.g., control block 410) is created for the thread, and initialized with certain values. As in the case of initiating a process, spawning a thread may include numerous steps as are known in the art, which are not explained herein in detail, and represented only at a high level by step 610. The thread priority value 501, affinity mask 502, and ideal node mask 503 are inherited from similar values for the process which spawned the thread (step 611); this may mean that process values are copied to a thread control block, or that the thread control block simply references the process values.

A preferred CPU for execution (called an "ideal CPU") is assigned to each thread by beginning at a random CPU in the ideal node and rotating the ideal CPU assignments on a round-robin basis. I.e., if the thread being spawned is the first thread spawned by the process, the "Y" branch is taken from step 612, and a CPU within the ideal node or nodes (designated by the thread's ideal node mask) is selected at random (step 613). If the thread being spawned is not the first thread, the "N" branch is taken from step 612, and the operating system increments the number of the CPU assigned to the last spawned thread according to any pre-established ordering relationship among the CPUs within the ideal node or nodes (step 614), and assigns this next CPU to the newly spawned thread (step 615).

It will be understood that FIG. 6 is a very simplified flow diagram of process and thread initialization for illustrating the initialization of certain variables used by the dispatcher, and is not intended as an exhaustive representation of the steps taken to initiate a process or spawn a thread.

The operation of thread dispatcher 304 in conjunction with ready queue 305 and information contained in control blocks 410 will now be described. In general, a dispatcher responds to an external event indicating that a new thread should be or may be dispatched, and determines the thread to be dispatched and/or CPU to execute the thread. In a first mode (shown in FIG. 7), the dispatcher is invoked to select an available thread from ready queue 305 when a CPU becomes available to execute a thread. This may occur, e.g., because the thread previously executing on the CPU encountered a long latency event (such as a storage access or lock on a resource), or because the previously executing thread timed out, or because the previously executing thread was interrupted, or because it finished execution. In a second mode (shown in FIG. 8), the dispatcher is invoked to select an available processor because a thread became ready for execution (e.g., a new thread was spawned, or an external event upon which a thread was waiting occurred, or some other event occurred to make a thread ready). It will be understood that, depending on the design of the operating system, a dispatcher may also be invoked for other reasons.

The heart of the dispatcher is a thread select mechanism, which selects a thread for dispatch. A thread is selected as a best match for an available CPU, and therefore when the thread select function is called, a target CPU for dispatching the thread is contemplated. In the preferred embodiment, this target CPU is generally the CPU which just became available and caused the dispatch function to be invoked.

Figure 7A:
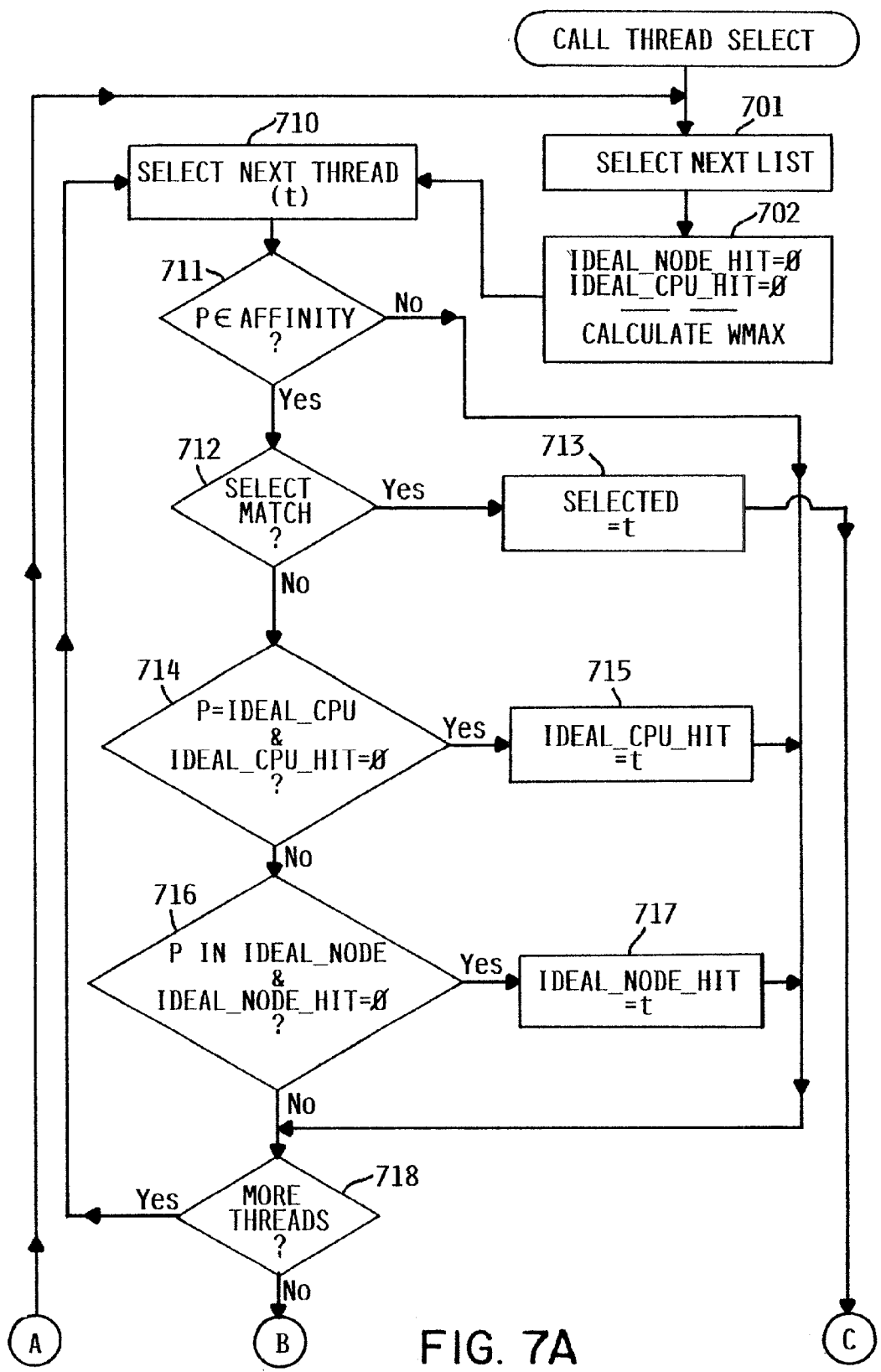
FIGS. 7A and 7B are collectively a flow diagram showing the selection of a thread for execution, according to the preferred embodiment.
Figure 7B:
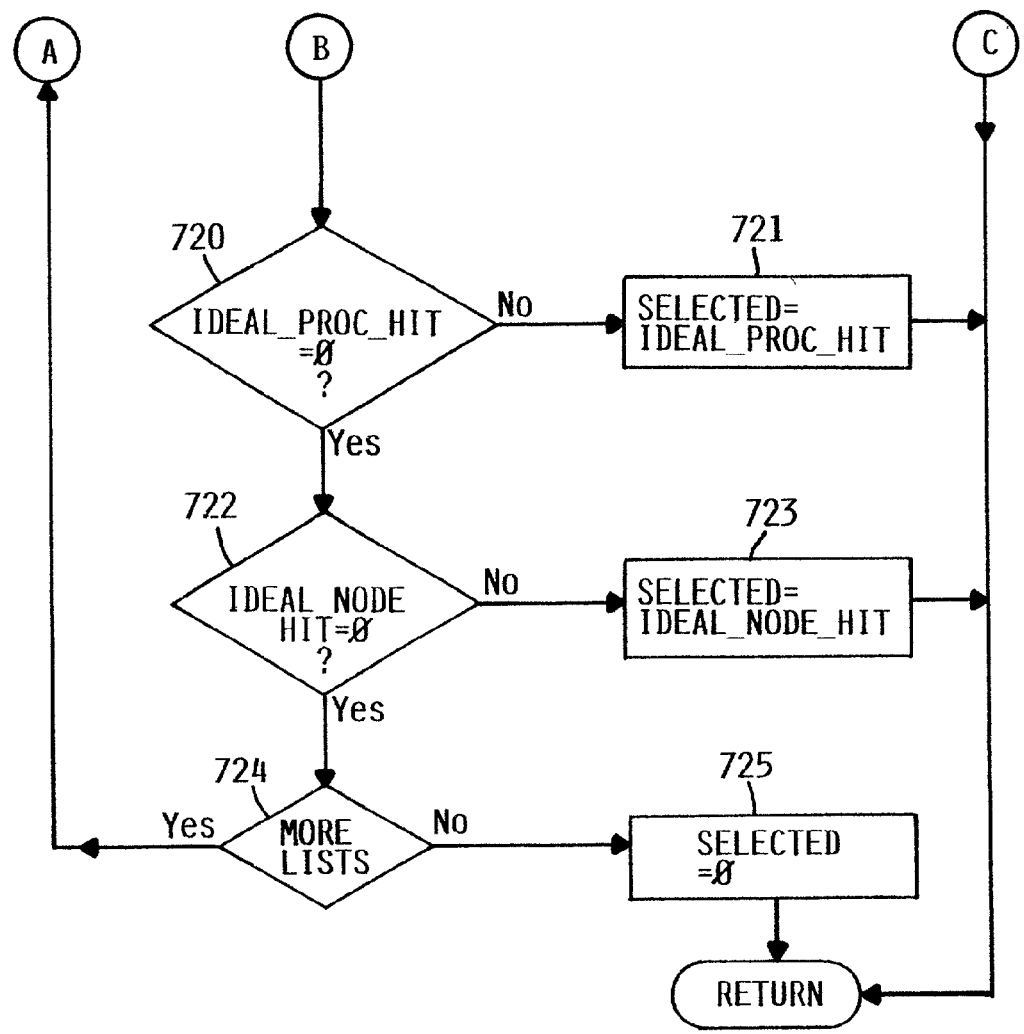

FIGS. 7A and 7B (herein referred to collectively as FIG. 7) are a flow diagram showing the operation of a thread select function within dispatcher 304. The thread select function is called to select a thread for a target CPU (designated P), which is generally the CPU which just became available, as explained above. The thread select function traverses the various control block lists 401–403 in ready queue 305 from highest priority to lowest priority until a suitable thread is found. As shown in FIG. 7, the thread select function first selects a list to traverse (step 701). Initially, the control block list selected is the highest priority list, and with each subsequent iteration of the main loop, step 701 selects the list having the highest priority of those lists which have not yet been examined. The variables ideal_node_hit and ideal_CPU_hit are initialized to null values (step 702). Additionally, the dispatcher determines a maximum waiting time (wmax) for threads in the selected control block list (also step 702). The maximum waiting time varies for each list, it being less for higher priority lists and greater for lower priority lists; it is therefore necessary to reset the value of wmax for each selected list being examined.

The thread select function then examines each thread in the selected control block list in turn until a match is found or the end of the list reached, shown in FIG. 7 as the loop comprising steps 710–718. A thread (t) from the list is selected (step 710). This thread is initially the first thread in the list, i.e., the thread whose control block has been in the list longest, and subsequently the thread which has been in the list longest among those which have not yet been selected. The thread select function then determines whether P is one of the CPUs in thread t's processor affinity (step 711), i.e., whether the bit corresponding to processor P is set in thread t's processor affinity mask 502. If not, thread t is precluded from executing on processor P, and the thread select function proceeds to step 718 to examine the next thread.

If P is in t's processor affinity (the "Y" branch from step 711), the thread select function determines whether t meets the criteria for immediate selection (step 712). The test performed in step 712 can be logically expressed as follows:

(t is in the real-time priority list) OR (1)

(t has been waiting longer than wmax) OR (2)

(($P$=last_CPU) AND ($P$=ideal_CPU)) OR (3)

(($P$=last_CPU) AND ($P$ is in $t$'s ideal node)) OR (4)

(($P$=last_CPU) AND (ideal_CPU∉'s Affinity)) OR (5)

((There is no ideal node) AND ($P$=ideal_CPU)) (6)

Conditions (1) and (2) override normal node matching considerations when there is urgency in dispatching thread t. The real-time priority list is a special high-priority control block list which effectively has a wmax of 0, so that any thread control block waiting in that list has exceeded its maximum waiting period. In all other control block lists, if thread t has already been waiting longer that the determined maximum period wmax for the list on which t is waiting, t is immediately selected for dispatch. Condition (3) selects a thread if the thread last executed on P (as specified in last_CPU field 505), and P is the ideal CPU of the thread specified by ideal_CPU field 504. Condition (4) is similar to (3), but expands the notion of ideal to any processor in t's ideal node, i.e., a node specified by t's ideal node mask 503. Condition (5) deals with the special case where there is no ideal CPU in thread t's affinity; this only occurs where some value (such as the affinity) has been altered after process initiation, as by an API call. In this case, it will be impossible to find an ideal CPU for thread t, and therefore the CPU last used is the best that can be done. Condition (6) deal with the special case where there is no ideal node specified in mask 503, and in this case the ideal CPU is preferred.

If the criteria expressed above for immediate selection are met, the "Y" branch is taken from step 712, thread t is designated the selected thread (step 713), and the thread selection function returns without further examining the remaining threads. If not, the "N" branch is taken. In that case, if P is the ideal CPU specified by ideal_CPU field 504 and this is the first such thread encountered (i.e., ideal_CPU_hit=null), then the "Y" branch is taken from step 714, and ideal_CPU_hit is set to t (step 715). If the "N" branch is taken from step 714, then if P is in the ideal node specified by ideal node mask 503, and this is the first such thread encountered (i.e., ideal_node_hit=null), then the "Y" branch is taken from step 716, and ideal_node_hit is set to t (step 717). If more thread remain in the selected control block list (step 718), the thread select function returns to step 710 to select and examine the next thread in the list. When all threads in the selected list have been examined, the "N" branch is taken from step 718. and the thread select function continues to step 720.

Having traversed the entire control block list, if ideal_CPU_hit is not null, the "N" branch is taken from step 720, the thread specified by ideal_CPU_hit is designated the selected thread (step 721), and the function returns without examining additional lists. If ideal_CPU_hit is null, the "Y" branch is taken from step 720. In this case, if ideal_node_hit is not null, the "N" branch is taken from step 722, the thread specified by ideal_node_hit is designated the selected thread, and the function returns without examining additional lists. If both ideal_CPU_hit and ideal_node_hit are null, the thread select function proceeds to step 724. If more control block lists remain to be examined, the "Y" branch is taken and the list having priority immediately below the current list is selected for examination. If all lists have been examined, the "N" branch is taken from step 724, a null value is designated as the selected thread (step 725), and the thread select function returns.

Figure 8:
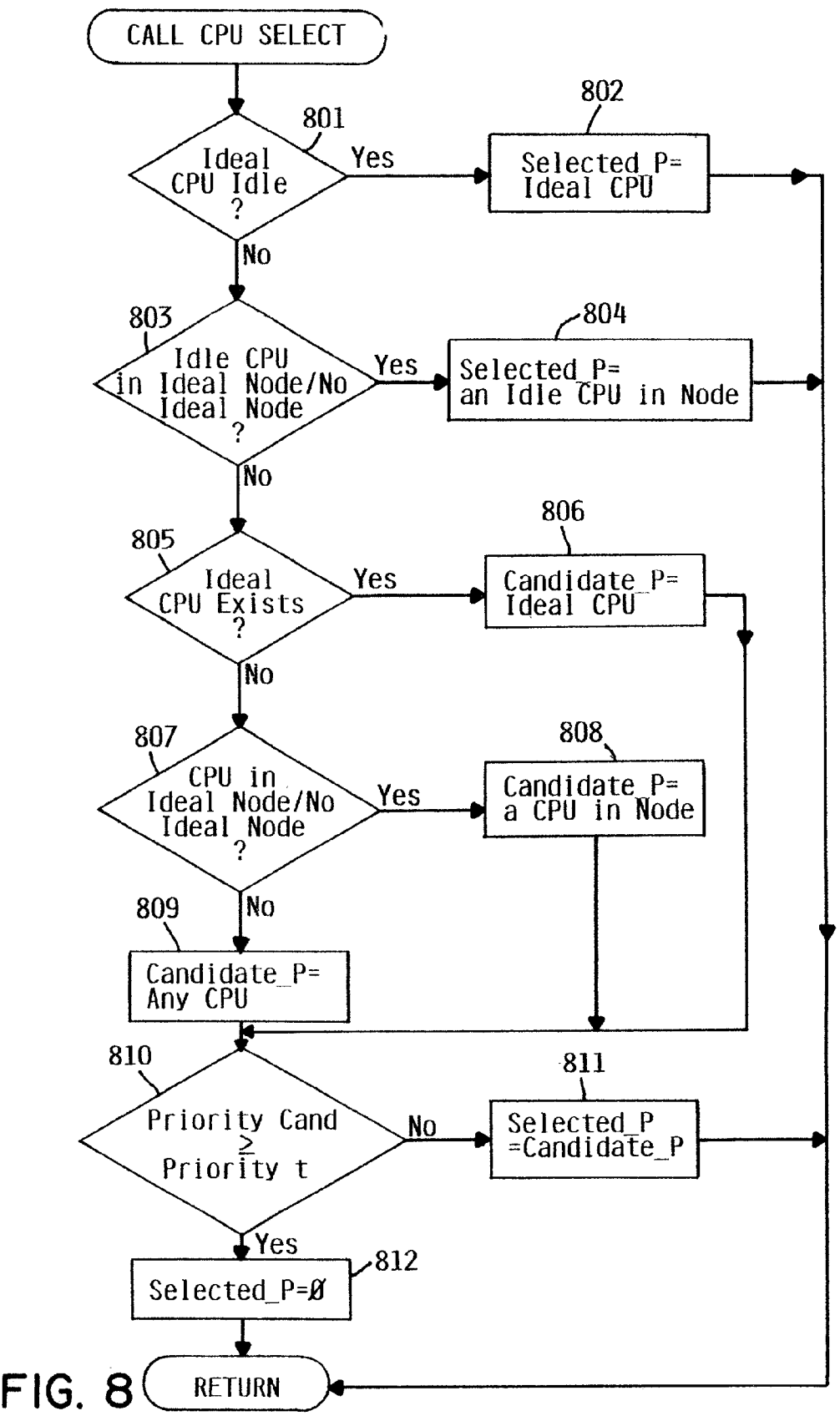
FIG. 8 is a flow diagram showing the selection of a CPU to execute a newly ready thread, according to the preferred embodiment.

When a thread becomes available to execute, the dispatcher is invoked to select an appropriate CPU for executing the thread, if possible. Unlike the thread select process of FIG. 7, the CPU select process is called to select a CPU from among multiple potential CPU candidates, given a specific target thread (designated t). This process is illustrated in FIG. 8.

The CPU select function first determines whether an ideal CPU exists in thread t's affinity and is currently idle (step 801). If so, the "Y" branch is taken from step 801, this ideal CPU is selected (step 802), and the thread select function returns. If not, the "N" branch is taken from step 801.

If there is at least one idle CPU within thread t's affinity, and which is in the ideal node for thread t if such an ideal node exists (i.e., in the case where no ideal node exists, the test is merely whether there is at least one idle CPU within thread t's affinity), then the "Y" branch is taken from step 803. In this case, one such CPU is selected (step 804). Where there is more than one idle CPU that meets the criteria of step 803, the CPU select function selects the CPU last used by thread t if it is one of the CPUs meeting the criteria, and if not, selects one of such CPUs based on default selection logic. The thread select function then returns. If no CPU meeting the above criteria was found at step 803, the "N" branch is taken to consider certain processors which are not idle.

If an ideal CPU exists which is in thread t's affinity, the "Y" branch is taken from step 805, and this ideal CPU is tentatively selected as a candidate CPU (step 806). In this case, the CPU is necessarily busy, or it would have been selected at step 801. If the "N" branch is taken from step 805 and there is a CPU within thread t's affinity which is also in thread t's ideal node if an ideal node exists (i.e., where there is no ideal node, then the test is whether there is a CPU within thread t's affinity), the "Y" branch is taken from step 807, and one such CPU is tentatively selected (step 808). Where there is more than one such CPU, the CPU select function tentatively selects the CPU last used by thread t if it is one of the CPUs meeting the criteria, and if not, tentatively selects one of such CPUs based on default selection logic. If the "N" branch was taken from step 807, the CPU select function tentatively selects a CPU in thread t's affinity using default selection logic (step 809).

If a candidate CPU was tentatively selected at steps 806, 808 or 809, the priority of any currently running thread in the candidate processor is compared to the priority of thread t (step 810). If t's priority is greater, the "N" branch is taken from step 810, and the candidate CPU is confirmed as the selected CPU (step 811). In this case, the selection of a CPU which is not idle will cause the currently executing thread to be pre-empted. If t's priority is not greater than that of the executing thread, the "Y" branch is taken from step 810, and the selected CPU is set to null. In either case, the CPU select function then returns. Where the CPU select function returns with a null selection, it was unable to find a suitable CPU for immediate dispatch of thread t, and thread t will therefore be placed on the ready queue to await eventual dispatch from the queue when selected by the thread select function described earlier. Thus, it will be observed that similar to the thread select function, the CPU select function may decline to select an idle CPU in a non-ideal node, even to the point where no CPU is selected and thread t is ultimately placed on the ready queue.

In general, the routines executed to implement the illustrated embodiments of the invention, whether implemented as part of an operating system or a specific application, program, object, module or sequence of instructions may be referred to herein as "computer programs" or simply "program". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Examples of signal-bearing media are illustrated in FIG. 2 as memory 210 and as storage device 224.

Advantages Over the Prior Art

Several observations may be made about the behavior of the thread selection algorithm described above. The dispatcher described above achieves NUMA-conscious behavior even though there is a single ready queue which is not associated with any CPU or group of CPUs. For most threads (having a single designated ideal node and a single designated ideal CPU), the thread will generally not be selected for dispatch unless processor P is at least in the thread's ideal node. Within the ideal node, a slight preference is given to a thread having P as its ideal processor over a thread having P in its ideal node but not its ideal processor. A thread is selected immediately as an ideal candidate, without further examination of the queue, if P was the last processor on which the thread executed and certain other conditions are met (see (3)–(5) in step 712); the last processor is significant because useful data may be in the processor's cache, in addition to the local memory of the node. If processor P was not the last processor on which the thread executed, but is in the ideal node or is the ideal processor, selection is tentative by means of the ideal_CPU_hit and ideal_node_hit variables, and will be overridden if a better candidate is found while traversing the queue. The thread selection algorithm will not necessarily select any thread even though threads are waiting on the queue. Finally, a thread waiting on the queue will eventually be selected for dispatch notwithstanding that P does not match the ideal node or ideal processor of the thread.

As a result of designating ideal nodes, threads will tend to execute in the same node, even if the ideal processor is not available. The pager loads paged data to the local memory of the node of the processor which generated the page request, and therefore data needed by the thread will tend to accumulate in the local real memory of the designated ideal node. As a result, a larger proportion of memory accesses from a CPU to the system's distributed real memory will access local real memory in the node of the CPU, rather than memory across a node boundary, than would be the case with a similar task dispatcher which does not take nodal placement into account. The increase in the proportion of intra-node memory accesses improves system throughput by reducing memory access time and reducing traffic on the inter-node communications medium.

Additional Alternative Embodiments

A specific algorithm for dispatching threads in a NUMA system has been described above in detail as a preferred embodiment. However, it will be appreciated that many variations in the above described algorithm are possible. The exact algorithm chosen will often depend on various hardware and software consideration specific to the computer system for which it is designed. In general, any thread dispatching algorithm from a common ready queue which takes into account the physical placements of processors with respect to subsets of a distributed memory system, so that long latency real memory accesses are reduced, could be used. The most obvious alternatives would be to remove one or more conditions described herein with respect to the preferred embodiment, or add some condition to the algorithm described herein. Some specific examples of additional variations are described below, it being understood that these are mentioned by way of example only and should not be deemed an exhaustive list of possible alternatives.

In one alternative, it would not be necessary to designate ideal processors or ideal nodes. The processor upon which a process or thread first executes may be randomly determined. The thread selection algorithm simply prefers threads which last executed on the target processor or on another processor in the same node. Because processors in the same node are preferred, the thread will tend to execute in a consistent node notwithstanding the lack of an ideal designation.

In another alternative, threads may be chosen by a mathematical evaluation function as opposed to the logic described above. The evaluation function provides an evaluation score for each thread in the queue, the thread having the optimal score being selected for dispatch. E.g., such an evaluation function may be of the form:

$$F_1(\text{wait time})+F_2(\text{node})+F_3(\text{CPU})+F_4(\text{Priority})+ \ldots$$

where $F_N$ are numerical functions of the respective independent variables. Of course, such an evaluation function may be more complex.

In the preferred embodiments described above, a NUMA computer system is architecturally designed as a collection of semi-independent nodes, each having an internal bus, processors, local memory, and so forth, and which are coupled together by an inter-nodal communications medium. Among the advantages of this design approach are scalability and modularity. Additionally, several examples of such NUMA system architectures have been constructed and are publicly available, and therefore some practical experience has already been obtained with this approach. However, a NUMA system according to the present invention would not necessarily have to be designed on such a nodal model. A dispatcher which accounts for non-uniform memory accesses in selecting a processor to execute a thread or task is potentially of value in any NUMA system, even if the system is based on some design model other than the nodal system described herein. Therefore any alternative system architecture, now known or hereafter developed, which exhibits characteristics of non-uniform memory access, might be employed. As one example of such an alternative architecture, a NUMA system may be a system having a complex memory bus structure, in which the memory bus comprises a web of bus segments linked by interfaces, and in which some memory accesses require only a single bus segment, while others traverse multiple segments and therefore require greater time. Other alternatives would be possible. Furthermore, although in the preferred embodiment, memory accesses are divided into two classes (intra-node and inter-node), a system may have more than two classes of memory accesses, each class requiring a different respective access time.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

I claim:

1. A method for dispatching threads to central processing units (CPUs) in a computer system, said computer system having a plurality of CPUs and a memory divisible into a plurality of discrete subsets, said method comprising the steps of:
    (a) identifying a target CPU of said plurality of CPUs;
    (b) identifying a set of threads which are eligible to execute on said target CPU, said set of threads waiting on a common ready queue wherein no CPU or group of CPUs receives preferential dispatching of tasks from said common ready queue;
    (c) identifying at least one target subset of said plurality of discrete subsets of memory for each respective thread of said set of threads, each target subset having a respective latency period for memory access by said target CPU to a location within the target subset, wherein said respective latency periods for memory access are not all identical, wherein each CPU of said plurality of CPUs is associated with a respective subset of said plurality of discrete subsets of memory, and wherein said step of identifying at least one target subset of said plurality of discrete subsets of memory comprises designating a respective preferred CPU for executing each thread of said set of threads, said target subset of said plurality of discrete subsets of memory being the subset of memory associated with said preferred CPU; and
    (d) selecting a thread from said set of threads for execution on said target CPU, said selecting step being based at least in part on said respective latency period of each target subset, wherein said step of selecting a thread from said set of threads for execution comprises allocating a first relative priority to a thread for which the designated preferred CPU is the target CPU, allocating a second relative priority to a thread for which the designated preferred CPU is associated with the same subset of memory as the target CPU, and allocating a third relative priority to a thread for which the designated preferred CPU is not associated with the same subset of memory as the target CPU, said first relative priority being greater than said second relative priority, and said second relative priority being greater than said third relative priority.

2. The method for dispatching threads of claim 1, wherein a plurality of CPUs is associated with each respective subset of said plurality of discrete subsets of memory.

3. The method for dispatching threads of claim 1, wherein said computer system comprises a plurality of discrete nodes, each node comprising at least one CPU and a respective subset of said plurality of discrete subsets of memory, wherein said step of identifying at least one target subset of said plurality of discrete subsets of memory for each respective thread comprises identifying at least one target node for each respective thread.

4. The method for dispatching threads of claim 3, wherein said step of identifying at least one target node for each respective thread comprises the step of designating a respective preferred CPU for executing each thread of said set of threads, said target node being the node in which said preferred CPU is located.

5. A method for dispatching threads to central processing units (CPUs) in a computer system, said computer system having a memory, a plurality of CPUs and a plurality of discrete nodes, each node containing a respective discrete subset of said plurality of CPUs and a respective discrete subset of said memory, wherein a memory access by a CPU to a location in said memory within the same node as the CPU requires a first latency period, and a memory access by a CPU to a location in said memory in a node different from that of the CPU requires a second latency period, said second latency period being longer than said first latency period, said method comprising the steps of:
   (a) determining that a first CPU in a first node is available to execute a thread, said first node having a plurality of CPUs;
   (b) identifying a set of threads which are eligible to execute on an available CPU of said computer system, said set of threads waiting on a common ready queue wherein no CPU or group of CPUs receives preferential dispatching of tasks from said common ready queue;
   (c) with respect to each of a plurality of threads, determining a respective preferred node for each thread, wherein said step of determining a respective preferred node for each thread comprises the step of designating a respective preferred CPU for executing each thread of said set of threads, said preferred node being the node in which said preferred CPU is located;
   (d) selecting a thread of said set of threads for execution on said first CPU, wherein said selecting step allocates a relative priority to a thread of said set of threads having said first node as its preferred node over a thread having a node other than said first node as its preferred node, wherein said step of selecting a thread from said set of threads for execution comprises allocating a first relative priority to a thread for which the designated preferred CPU is the target CPU, allocating a second relative priority to a thread for which the designated preferred CPU is in the same node as the target CPU, and allocating a third relative priority to a thread for which the designated preferred CPU is not in the same node as the target CPU, said first relative priority being greater than said second relative priority, and said second relative priority being greater than said third relative priority.

6. The method for dispatching threads of claim 5, wherein each node contains a plurality of CPUs.

7. The method for dispatching threads of claim 5, wherein said step of designating a respective preferred CPU for executing each thread of said set of threads is performed when the thread is spawned.

8. A method for dispatching threads to central processing units (CPUs) in a computer system, said computer system having a plurality of CPUs and a memory divisible into a plurality of discrete subsets, wherein each of said plurality of CPUs is associated with a respective one of said plurality of discrete subsets of memory, wherein a memory access by a CPU to its associated memory subset of said plurality of discrete subsets requires a first latency period, and a memory access by a CPU to a memory subset other that said its associated memory subset requires a latency period greater than said first latency period, said method comprising the steps of:
   (a) identifying a thread ready to execute on a CPU from a common ready queue, wherein no CPU or group of CPUs receives preferential dispatching of tasks from said common ready queue;
   (b) identifying a set of CPUs which are eligible to execute said thread;
   (c) associating a preferred subset of said plurality of discrete subsets of memory with said thread, wherein said step of associating a preferred subset of said plurality of discrete subsets of memory with a thread comprises designating a respective preferred CPU for executing each thread, said associated subset of said plurality of discrete subsets of memory being the subset of memory associated with said preferred CPU; and
   (d) selecting a CPU from said set of CPUs for executing said thread, said selecting step allocating a relative priority to a CPU associated with said preferred subset of memory over a CPU associated with a subset of memory other than said preferred subset of memory, wherein said step of selecting a CPU from said set of CPUs comprises allocating a first relative priority to the preferred CPU, allocating a second relative priority to a CPU associated with the same subset of memory as the preferred CPU, and allocating a third relative priority to a CPU associated with a different subset of memory than that with which the preferred CPU is associated, said first relative priority being greater than said second relative priority, and said second relative priority being greater than said third relative priority.

9. The method for dispatching threads of claim 8, wherein a plurality of CPUs is associated with each respective subset of said plurality of discrete subsets of memory.

10. The method for dispatching threads of claim 8, wherein said computer system comprises a plurality of discrete nodes, each node comprising at least one CPU and a respective subset of said plurality of discrete subsets of memory, each CPU being associated with the subset of said plurality of discrete subsets of memory which is within the same node.

11. The method for dispatching threads of claim 8, wherein said step of designating a respective preferred CPU for executing each thread is performed when the thread is spawned.

* * * * *